Patented Aug. 12, 1947

2,425,343

UNITED STATES PATENT OFFICE 2,425,343

MAKING CYCLOALKYLACETIC ACIDS

Earl L. Pelton and Andrew A. Holzschuh, Midland, Mich., assignors to The Dow Chemical Company, Midland, Mich., a corporation of Michigan No Drawing. Application April 14, 1945, Serial No. 588,410

8 Claims. (Cl. 260—514)

This invention relates to an improved method for the preparation of cyclopentyl- and cyclohexylacetic acids and their alkali metal salts.

The invention is based on the discovery that when a cycloalkylbutyric acid is heated together with an alkali metal hydroxide at a temperature from about 370° C. to about 430° C., the molecules of the acid undergo oxidative scission, with the formation of the corresponding cycloalkylacetic acid salt, together with an acetate and hydrogen. The reaction may be formulated

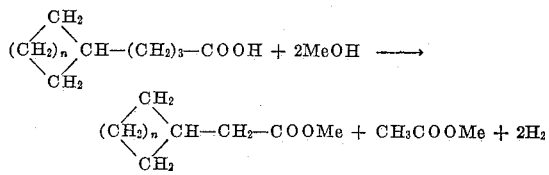

$n$ being 2 or 3 and Me being an alkali metal. The resulting cycloalkylacetic acid salt may then be separated from the reaction mixture, or may be converted to the free acid, and the latter recovered.

In making cycloalkylacetic acid salts, the cycloalkylbutyric acid, i. e., cyclopentylbutyric acid (Chem. Abstr. 38, 5801 (1944)) or cyclohexylbutyric acid, may be added to the heated alkali hydroxide either as the free acid or in the form of an alkali metal salt. Addition of the free acid, which is liquid, is particularly convenient, and is ordinarily the method chosen. Under some conditions there may be a tendency for a small part of the acid to pyrolyze to a complex hydrocarbon. Less decomposition is evident when the salt of the acid is employed, but there is the troublesome necessity of introducing a solid slowly into a reaction vessel.

Alternatively, and often more conveniently, the cycloalkylbutyric acid or a salt thereof is not added as such to the alkali hydroxide, but is formed in situ by adding to the hydroxide a compound which, at the temperature of 370° to 430° C., reacts to make a cycloalkylbutyric acid salt. This latter then reacts further, in accordance with the invention, to form the desired cycloalkylacetic acid salt.

A particularly effective compound of this type, useful in making cyclohexylacetic acid, is the acid having the formula $C_{12}H_{20}O_2$, characterized in U. S. Patent No. 2,010,692, and now believed to be 6-(2-cyclohexenyl)-hexanoic acid. An alkali metal salt of this acid is readily prepared by reacting cyclohexanol with a nearly anhydrous fused mixture of sodium and potassium hydroxide at a temperature of 275° to 320° C., as described in U. S. Patent No. 1,961,623. The resulting salt may be isolated and used directly in the process of the invention, or the free acid itself may be liberated from the reaction mixture and purified for use in the present process. In either case, the salt of the acid $C_{12}H_{20}O_2$, in the presence of alkali hydroxide at 370° to 430° C., is readily oxidized to a salt of cyclohexylbutyric acid, which latter then reacts as formed to yield a salt of cyclohexylacetic acid.

Insofar as known, any alkali metal hydroxide may be used in the oxidation of the cycloalkylbutyric acids to the corresponding cycloalkylacetic acids. Optimum yields are obtained with fused potassium hydroxide, although mixtures of potassium hydroxide with sodium hydroxide or lithium hydroxide, or either of these latter alkalies alone, may be employed. Reaction proceeds most readily when a large excess of the hydroxide is present.

In general, the best yields of cyclohexylacetic acid salt and minimum formation of undesirable by-products are obtained when the alkali hydroxide is maintained substantially saturated with water at the reaction temperature. Only a very small percentage of water is required. Saturation is most conveniently achieved by allowing water to drip slowly into the vessel throughout the process, any excess added simply steaming off. However, the process may also be carried out in a closed container to prevent escape of the water, in which case continuous addition is not necessary.

The presence in the reaction mass of alkali metal acetate, which is one of the reaction products, appears to be advantageous, and it is desirable, though not essential, to add this material to the alkali hydroxide at the start of the process. The function of the acetate is not clearly established, but it appears to reduce the viscosity of the mixture and possibly also to assist the hydroxide in wetting the organic reactant.

The temperature of the reaction mixture should be carefully controlled in the range of about 370° to about 430° C., with by far the best results being obtained at about 375° to about 400° C. Below about 370° C. little if any cycloalkylacetic acid is formed, whereas above about 430° C. the acid tends to decompose.

A preferred procedure for carrying out the invention is to introduce the cycloalkylbutyric acid or salt thereof, or compound capable of forming the same, or mixtures thereof, into contact with a body of the heated alkali metal hydroxide, to which a small proportion of alkali metal acetate has been added. The hydroxide is stirred or kneaded vigorously, and the organic reactant is introduced gradually, usually over a period of one or more hours. Provision is made for introducing water slowly and for venting the hydrogen liberated. If the reaction mass tends to thicken or to foam, additional alkali metal hydroxide, or alkali metal acetate, may be added from time to time. After addition of reactants is complete, the mixture is then held at the operating temperature for a considerable period, usually 6 to 18 hours, to insure maximum yield of desired material.

At the end of this period, the mass is cooled and the products worked up. The cyclohexylacetic acid salt may, if desired, be separated by diluting the reaction mixture with water to a concentration of about 20 to 40 per cent alkali by weight, whereupon the cyclohexylacetic acid salt separates as a soap-like layer. Preferably, the entire reaction mass is mixed with water and then rendered strongly acidic with a mineral acid, the organic reaction products, excepting the acetic acid, separating as a distinct layer. This latter is withdrawn and the cycloalkylacetic acid is separated from the other ingredients, mostly unreacted cycloalkylbutyric acid, by fractional distillation at reduced pressure.

The following examples will illustrate the invention:

*Example 1*

An externally heated steel reaction vessel provided with a reflux condenser, a hydrogen vent, and mechanically-driven mixing blades was loaded with 60 pounds of potassium hydroxide and heated to 375° C. The stirrer was operated, and 6.4 liters of glacial acetic acid (to form potassium acetate) and 15 pounds of cyclohexylbutyric acid were separately added slowly. Then 18 pounds more of potassium hydroxide was introduced, after which 15 more pounds of cyclohexylbutyric acid and 1.6 liters of acetic acid were added slowly. This entire latter operation was repeated twice, after which a fourth addition of 18 pounds of potassium hydroxide was made. In all, 132 pounds of hydroxide, 11.2 liters of acetic acid, and 60 pounds of cyclohexylbutyric acid were added during a period of 7 hours. The resulting mixture was then heated at 375° C. and stirred for an additional 20 hours, a small quantity of water being added continuously and allowed to steam off. At the end of this time, the mass was poured out of the reactor, cooled, mixed with water, filtered to remove solid matter, and acidified strongly with hydrochloric acid. An oily layer formed and was withdrawn and distilled fractionally under vacuum. There was obtained 23 pounds of cyclohexylacetic acid (a 46% yield), as well as 19.2 pounds of unreacted cyclohexylbutyric acid.

*Example 2*

A 1000 gram quantity of flake potassium hydroxide was placed in an apparatus similar to that of Example 1 and was heated at 380° to 390° C. 400 grams of an oily mixture of cyclohexylbutyric acid and the acid $C_{12}H_{20}O_2$ (the mixture being a distillate of the acidified product obtained by oxidizing cyclohexanol in a fused potassium hydroxide-sodium hydroxide mixture, and containing 28 per cent by weight of the acid $C_{12}H_{20}O_2$) was added dropwise to the stirred fused hydroxide during a 2-hour period, after which heating was continued for 2 hours more. The resulting mass was cooled and worked up as in Example 1. There was obtained 90 grams of cyclohexylacetic acid, a 30% yield.

*Example 3*

A charge of 50 pounds of potassium hydroxide and 4 pounds of glacial acetic acid was introduced into the reactor of Example 1 and heated to 375° C. A 12.5 pound batch of an oil consisting of about 20 per cent cyclohexylbutyric acid and about 80 per cent of the acid $C_{12}H_{20}O_2$ (the oil being a distillate of the type in Example 2) was then run in slowly with stirring. Then 37.5 pounds more of the oil and 60 pounds of potassium hydroxide were added slowly during 6 hours. The mixture was then heated 18 hours, with gradual addition of water, 15 pounds more of potassium hydroxide being added 6 hours before the end of the run. The resulting mass was cooled and worked up as in Example 1. There were obtained 20.5 pounds of cyclohexylacetic acid (a 54.5 per cent yield) and 17.5 pounds of cyclohexylbutyric acid.

The invention claimed is:

1. In a method of making a cycloalkylacetic acid, the step which comprises reacting a compound corresponding to the general formula

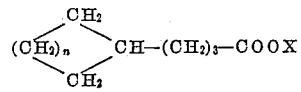

wherein $n$ is one of the integers 2 and 3 and X is a substituent selected from the class consisting of hydrogen and alkali metal, with at least one alkali metal hydroxide at a temperature between about 370° C. and about 430° C.

2. In a method of making cyclohexylacetic acid, the steps which comprise heating a compound selected from the class consisting of cyclohexylbutyric acid and its alkali metal salts with at least one alkali metal hydroxide at a temperature between about 375° C. and about 430° C., and recovering cyclohexylacetic acid from the reaction product.

3. A method according to claim 2 wherein the alkali metal hydroxide is maintained substantially saturated with water at the reaction temperature.

4. A method according to claim 2 wherein cyclohexylbutyric acid is heated with potassium hydroxide.

5. A method according to claim 2 wherein alkali metal acetate is added to the alkali metal hydroxide.

6. In a method of making cyclohexylacetic acid, the step which comprises reacting a compound selected from the class consisting of the acid having the empirical formula $C_{12}H_{20}O_2$ and its alkali metal salts, the acid being that obtained in salt form by reacting cyclohexanol with a mixture of sodium and potassium hydroxides at a temperature of 275° C. to 320° C., with at least one alkali metal hydroxide at a temperature from about 375° C. to about 430° C.

7. The method of making cyclohexylacetic acid which comprises heating a compound selected from the class consisting of cyclohexylbutyric acid and its alkali metal salts with an excess of alkali metal hydroxide at a temperature between about 375° C. and about 430° C. for a time sufficient to form an alkali metal salt of cyclohexylacetic acid, the alkali metal hydroxide being maintained substantially saturated with water at the reaction temperature, cooling and acidifying the resulting mixture, and separating cyclohexylacetic acid from the acidified mass.

8. The method of making cyclohexylacetic acid which comprises heating a compound selected from the class consisting of cyclohexylbutyric acid and its alkali metal salts with at least one alkali metal hydroxide at a temperature between about 375° C. and about 400° C., and thereafter recovering cyclohexylacetic acid from the reaction mass.

EARL L. PELTON.
ANDREW A. HOLZSCHUH.

REFERENCES CITED

The following references are of record in the file of this patent:

UNITED STATES PATENTS

| Number | Name | Date |
|---|---|---|
| 1,961,623 | Pelton | June 5, 1934 |